United States Patent [19]

Lorenz et al.

[11] Patent Number: 5,292,397
[45] Date of Patent: Mar. 8, 1994

[54] METHOD OF AND APPARATUS FOR LOCATING THE ENDS OF WEBS

[75] Inventors: Bernhard Lorenz, Freising; Christian Richter, München; Rainer Tuercke, Taufkirchen, all of Fed. Rep. of Germany

[73] Assignee: Agfa-Gevaert Aktiengesellschaft, Leverkusen, Fed. Rep. of Germany

[21] Appl. No.: 978,240

[22] Filed: Nov. 18, 1992

[30] Foreign Application Priority Data

Dec. 18, 1991 [DE] Fed. Rep. of Germany ....... 4141895

[51] Int. Cl.⁵ .............................................. B32B 31/00
[52] U.S. Cl. ..................................... 156/351; 156/64; 156/159; 156/361; 156/502
[58] Field of Search ................ 156/64, 159, 351, 361, 156/502

[56] References Cited

U.S. PATENT DOCUMENTS

| | | | |
|---|---|---|---|
| 3,586,571 | 1/1969 | Szakas | 156/502 |
| 3,689,786 | 8/1972 | Williams et al. | 156/502 |
| 3,769,141 | 10/1973 | Haugen et al. | 156/502 |

*Primary Examiner*—David A. Simmons
*Assistant Examiner*—Mark A. Osele
*Attorney, Agent, or Firm*—Darby & Darby

[57] ABSTRACT

The trailing end of a web of photosensitive material which is being unwound from a core in a cassette is connected to the core by an elongated strip. A monitoring device is placed adjacent the path of movement of the web from the core to the nip of two advancing rolls, and the monitoring device is activated as soon as it detects the strip. The motor for the advancing rolls is driven for an interval of time and at a speed such that, when the monitoring device detects the trailing end of the strip, the web is advanced through a predetermined distance to locate its trailing end at a splicing station where the trailing end of the web is to be spliced with the leader of a next-following web.

18 Claims, 2 Drawing Sheets

METHOD OF AND APPARATUS FOR LOCATING THE ENDS OF WEBS

BACKGROUND OF THE INVENTION

The invention relates to improvements in methods of and in apparatus for manipulating webs of photosensitive material. More particularly, the invention relates to improvements in methods of and in apparatus for manipulating webs (e.g., exposed or exposed and developed photographic films or webs of photographic paper) whose trailing ends are spliced or otherwise affixed to leaders of elongated flexible strips of paper, plastic or the like and wherein the trailing end of the strip is connected to a carrier, e.g., to a core which is rotatably mounted in a cassette or another suitable housing or support and serves as a means for storing a supply of convoluted web and strip.

Photographic laboratories which are designed to process large numbers of customer films per unit of time are normally equipped with devices (such as suitable splicers) which join a large number of exposed but undeveloped customer films end-to-end in order to form an elongated composite web which is convoluted onto a core and is stored in a light-tight cassette or another housing or receptacle. A cassette which contains a composite web consisting of a large number of customer films is then transferred to an optimum position for admission of successive films of the composite web directly into a developing machine. It is further customary to ensure that the films which happen to be in the process of advancing through the baths and other stations of the developing machine will not come to a halt when the supply of interconnected films in a cassette is exhausted. This could result in damage to or in total destruction of one or more films which are confined in the baths of the developing machine while the emptied cassette is being replaced with a fresh (filled) cassette and the leader of the foremost film in the fresh cassette is being spliced to the trailing end of the last film which has been withdrawn from the emptied cassette. Proposals to avoid damage to exposed films in the developing machine include the provision of a magazine which is located upstream of the inlet of the developing machine and stores a reasonable supply of exposed film for transport into and through the developing machine while the last or rearmost film of such supply is being spliced to the foremost film of a composite web in the fresh cassette.

As a rule, the capacity of the magazine upstream of the developing machine is relatively small in order to save space and for certain other reasons (such as accessibility of the inlet of the developing machine). Therefore, it is necessary to carry out the splicing operation with little loss in time. An important prerequisite for shortening the interval which is required to complete a splicing operation is to rapidly detect the trailing end of the last film of a preceding composite web for proper positioning preparatory to splicing of such trailing end to the leader of the foremost film of the next-following composite web. This renders it possible to reduce the capacity of the magazine as well as to accurately position the detected trailing end at the splicing station for attachment to the leader of the foremost film of the next composite web.

Attempts to locate the trailing end of the last film of a composite web which is being unwound from a core or spool in the interior of a cassette include the provision of means for monitoring the rotary movement of the core or spool in a cassette for a composite web of interconnected exposed photographic customer films. Signals denoting the angular position of the core were to be processed in order to ascertain the location of the trailing end of the last film of the composite web. Such proposal has failed to find acceptance in the relevant industry because the trailing end of the last film could not be detected with a requisite degree of accuracy. One of the reasons is that the trailing end of the last film of a web consisting of a plurality of spliced-together customer films is likely to become separated from the core or spool while the latter is still surrounded by one, two or more convolutions of the last film.

In accordance with another presently known proposal, the developing machine is provided or combined with apparatus for continuously monitoring a marginal portion of a composite web of spliced together exposed photographic films which are in the process of entering the first bath (normally a developing bath) in a developing machine. Such apparatus render it possible to accurately detect the trailing end of the last or rearmost film of a web; however, each such apparatus is capable of monitoring only one specific format or type of exposed films. Thus, it is necessary to furnish the developing machine with two or more discrete monitoring apparatus, one for each popular type or format of customer films. Proper monitoring of successive composite webs consisting of photographic films having different sizes in accordance with the just outlined proposal is possible only if the web is monitored in the middle between its marginal portions. This will invariably result in damage to or even complete destruction of a large number of exposed but undeveloped customer films, a situation which is unacceptable to the owners of photographic processing laboratories.

OBJECTS OF THE INVENTION

An object of the invention is to provide a novel and improved method of reliably locating the trailing ends of exposed customer films and/or other webs of photosensitive material irrespective of the format of the webs.

Another object of the invention is to provide a method which renders it possible to rapidly and reliably locate the trailing ends of strips of photographic material regardless of the format of such strips and without causing any damage thereto.

A further object of the invention is to provide a novel and improved method of manipulating customer films which are spliced together to form an elongated composite web and are connected to and convoluted around a core or another suitable rotary carrier by means of an elongated flexible strip extending between a locus of connection to the core and the trailing end of the last or innermost film of the composite web.

An additional object of the invention is to provide a simple and inexpensive method which can be practiced with equal advantage to detect the trailing ends of wide, narrow or medium wide webs of photosensitive material.

Still another object of the invention is to provide a simple and inexpensive method of positioning the trailing ends of successive composite webs of photosensitive material at a splicing station, e.g., upstream of a developing machine for customer films.

A further object of the invention is to provide a novel and improved apparatus for the practice of the above outlined method.

Another object of the invention is to provide the apparatus with novel and improved means for monitoring wide, narrow or medium wide webs of photosensitive material for the presence of their trailing ends.

An additional object of the invention is to provide the apparatus with novel and improved means for monitoring the customary strips of flexible material which are used to connect the last or rearmost films of composite webs of spliced-together films with the rotary cores in cassettes for exposed but undeveloped photographic films.

Still another object of the invention is to provide an apparatus which can reliably position the trailing ends of rearmost or last webs of a composite web at a selected location, particularly at a splicing station upstream of a developing machine in a photographic processing laboratory.

A further object of the invention is to provide an apparatus which can be used with existing developing machines and renders it possible to reduce the size of magazines for exposed and undeveloped photographic films upstream of the inlet of the developing machine.

Another object of the invention is to provide an apparatus which subjects the exposed but undeveloped films to gentle treatment irrespective of the format of the films.

An additional object of the invention is to provide the apparatus with novel and improved means for maintaining the running web under requisite tension.

Still another object of the invention is to provide the apparatus with a novel and improved braking device for a composite web consisting of a large number of spliced together photographic customer films.

A further object of the invention is to provide an apparatus whose space requirements do not exceed those of heretofore known and used apparatus and whose operation can be automated to any desired extent.

Another object of the invention is to provide an apparatus which can process webs of photosensitive material stored in conventional cassettes or analogous receptacles for light-tight confinement of exposed but undeveloped photographic customer films.

An additional object of the invention is to provide a novel combination of splicer, web monitoring means and web advancing means for use in the above outlined apparatus.

Still another object of the invention is to provide a processing laboratory which employs one or more apparatus of the above outlined character.

SUMMARY OF THE INVENTION

One feature of the present invention resides in the provision of a method of properly locating a trailing end of an elongated flexible strip having a leader affixed (e.g., spliced) to a trailing end of an elongated flexible web of photosensitive material (e.g., a strip of exposed photographic film) which is wound onto a rotary carrier (e.g., a core or spool which is rotatable in a cassette for convoluted photographic film) separably connected (e.g., by an adhesive-coated band) to the trailing end of the strip. The improved method comprises the steps of unwinding successive increments of the web from the carrier (with simultaneous rotation of the carrier in a direction to pay out the web) and advancing the unwound increments of the web along a predetermined path, positioning next to a predetermined portion of the path a signal generating monitoring device which is activatable to detect the trailing end of the strip subsequent to separation of the strip from the carrier, and activating the monitoring device upon advancement of the leader of the strip at least into the predetermined portion of the path.

The strip is preferably dimensioned (e.g., severed from a longer strip) in such a way that it has a predetermined length. The aforementioned portion of the path is spaced apart from the carrier a distance which at most equals the predetermined length of the strip, and the unwinding and advancing step then comprises rotating the carrier by the strip until the trailing end of the strip becomes separated from the carrier. The activating step of such method can include setting the monitoring device in operation to detect the trailing end of the strip at least substantially simultaneously with termination of rotation of the carrier by the strip, i.e., when the leader of the strip is located at or beyond the predetermined portion of the path.

The advancing step can include advancing or transporting the web along the path at a first speed prior to and at a lesser second speed following activation of the monitoring device. Furthermore, such advancing step can include transporting the web through a predetermined distance following detection of the trailing end of the strip by the monitoring device. This can serve to locate the trailing end of the web at a splicing station where the leader of the strip is separated (e.g., with a transverse cutter) from the trailing end of the web.

The positioning step can include utilizing a mechanical, a photoelectronic or any other suitable monitoring device which generates a signal in response to detection of the trailing end of a strip subsequent to advancement of the web beyond the monitoring station and following separation of the trailing end of the strip from the carrier.

The method can further comprise the step of braking the carrier in the course of the unwinding and advancing step. The braking step can comprise applying to the carrier a variable braking force, and such method can further comprise the step of varying the braking force as a function of one or more variable parameters, e.g., the resistance offered by the carrier to rotation in a direction to pay out first the web and thereupon the strip.

Another feature of the invention resides in the provision of an apparatus for locating a trailing end of an elongated flexible strip having a leader affixed (e.g., spliced) to the trailing end of a web of photosensitive material which is wound onto a rotary carrier (e.g., a core) separably connected to the trailing end of the strip. The improved apparatus comprises means (e.g., a cassette for exposed and developed photographic film or a cassette for exposed but undeveloped photographic film) for rotatably supporting the carrier, means for unwinding successive increments of the web from the carrier and for advancing the thus unwound increments along a predetermined path (e.g., along a meandering path), and a monitoring device which is adjacent a predetermined portion of the path and includes means for generating signals. The signal generating means is activatable to generate a signal in response to detection of the trailing end of the strip in the predetermined portion of the path. The signal generating means of the monitoring device is activatable in response to advancement of the leader of the strip into the predetermined portion of the path, i.e., such activation can take place well ahead of the instant of arrival of the trailing end of the strip (such trailing end becomes separated from the carrier a result of advancement of the web by the combined unwinding and advancing means) into the predetermined portion of the path, i.e., into the range of the signal generating means.

In accordance with a presently preferred embodiment of the apparatus, the signal generating means of the monitoring means comprises a first sensor, a second sensor which is movable relative to the first sensor, and means for biasing the second sensor toward an operative position in which the sensors cooperate to generate a signal. The web is trained over the second sensor to oppose the movement of the second sensor to the operative position while the trailing end of the strip remains attached to the carrier, i.e., as long as the carrier continues to oppose advancement of the web and strip along the predetermined path.

At least one of the sensors can comprise a rotary member, e.g., an idler roller. For example, the first sensor can comprise a rotary member, and the apparatus can further comprise means for monitoring rotation of the first sensor; this can be indicative of separation of the trailing end of the strip from the carrier and/or of advancement of the trailing end of the web to a position at a predetermined distance from the predetermined portion of the path.

For example, the first and second sensors can respectively comprise first and second rotary members. One of these rotary members has a peripheral surface with a circumferentially extending recess which is overlapped by the web and thereupon by the strip during advancement of the web along the predetermined path. The other rotary member can be provided with a peripheral radially outwardly extending projection which extends into the recess in response to advancement of the strip beyond the nip of the rotary members to thereby initiate the generation of a signal. The recess can be provided in the second rotary member and the latter then preferably comprises two halves which are mirror images of each other with reference to a plane halving the recess and extending at right angles to the axis of rotation of the second rotary member. The peripheral surface of the second rotary member can include a plurality of stepped annular portions at opposite sides of the recess. Such stepped annular portions can include two first annular portions which are adjacent the recess (i.e., the recess is disposed between them) and have a first diameter, and two second annular portions having a greater second diameter. The first annular portions and the recess between the first annular portions are disposed between the second annular portions.

The apparatus can further comprise means for splicing the trailing end of the web in the predetermined path downstream of the signal generating means with a leader of a second web having a trailing end connected to a leader of a second strip. The splicing means can include means for severing the leader of the strip behind the web in the path downstream of the splicing means from the leader of the respective strip (namely the strip whose trailing end has become separated from the carrier).

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF THE PREFERRED EMBODIMENTS

Figure 1:
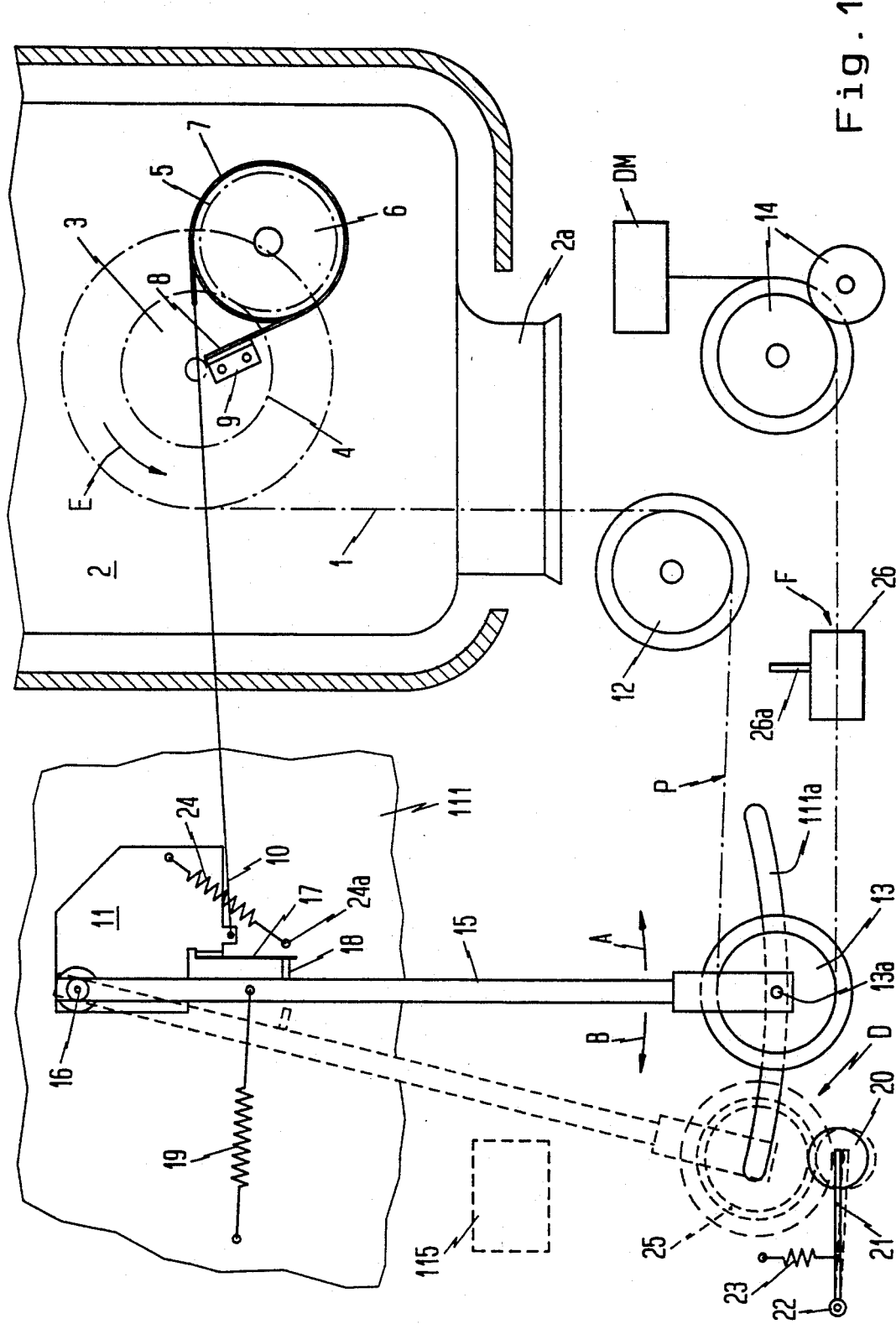
FIG. 1 is a schematic partly elevational and partly sectional view of an apparatus which embodies one form of the present invention.
Figure 1A:
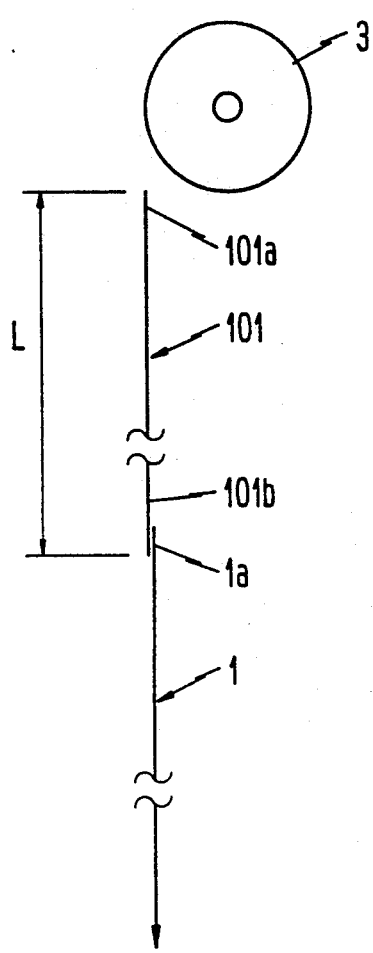
FIG. 1a is a schematic view of a carrier for a web of photosensitive material, of a portion of the web and of a strip immediately upon separation of the strip from the carrier.

FIGS. 1 and 1a show an elongated flexible web 1 consisting of a series of exposed but undeveloped photographic customer films which are joined end-to-end, e.g., by splicing. The web 1 is stored in a cassette 2 which constitutes a means for rotatably supporting a carrier 3, e.g., a core or spool for the web 1. The trailing end 1a of the web 1 is connected to the leader 101b of an elongated flexible strip 101 of paper or the like, and the trailing end 101a of the strip is separably connected (e.g., by an adhesive-coated band) to the peripheral surface of the carrier 3. When the improved apparatus is in use, a combined unwinding and advancing unit 14 advances or transports the web 1 along an elongated meandering path P from the carrier 3 (which is rotated by the web 1 in a counterclockwise direction as indicted by the arrow E) through the nip of two rolls forming part of the unit 14 and into the inlet of a developing machine DM of any known design.

The carrier 3 is braked to oppose the unwinding of the web 1. The braking device includes a first gear 4 which is coaxial with and is affixed to the core 3, a second gear 5 which mates with the gear 4, and a brake drum 6 which is coaxial with and can be rotated by the gear 5. A brake band 7 is trained over the drum 6 and one (8) of its ends is affixed to a stationary holder 9 which is installed in the cassette 2 or in a housing 111 serving to receive the cassette and other parts of the improved apparatus and to shield the web 1 from daylight or artificial light around the housing 111. The other end 10 of the brake band 7 is affixed to a pivotable member 11 consisting of sheet metal or the like.

The cassette 2 has an outlet 2a for the web 1, and such outlet is adjacent a deflecting member 12 (e.g., an idler roller) which is installed in the housing 111 and directs successive increments of the web 1 toward a monitoring device including two sensors 13, 20 serving to generate a signal in response to detection of the trailing end 101a of a strip 101. The web 1 is trained over the sensor 13 which preferably constitutes a rotary member, e.g., a pulley of the type shown in FIG. 2) and thereupon advances through a splicing device 26 on its way toward and through the nip of the rolls forming part of the advancing device 14 and thence into the inlet of the developing machine DM. The sensor 13 is mounted at one end of an elongated one-armed lever 15 which is pivotably mounted in the housing 111, as at 16, and is biased by a coil spring 19 serving to urge the mobile sensor 13 toward the other sensor 20. The pivot 16 for the lever 15 also supports the aforementioned plate-like member 11 which is connected to the end 10 of the brake band 7.

The lever 15 carries an abutment 18 for the free end of a leaf spring 17 the other end of which is affixed to the member 11. The latter is biased in a clockwise direction, as viewed in FIG. 1, by a coil spring 24 secured to a retainer 24a in the housing 111.

The lever 15 is pivotable in directions indicated by arrows A and B between the solid-line position and the broken-line position of FIG. 1. When in the broken-line position, the lever 15 causes the sensor 13 to displace the sensor 20 against the opposition of a coil spring 23 which urges an arm 21 for the sensor 20 in a clockwise direction. The arm 21 is turnably or flexibly mounted in the housing 111, as at 22, and its free end carries the sensor 20. The latter is rotatable about its own axis. The shaft 13a for the sensor 13 is movable in an arcuate guide slot 111a which is provided in the interior of the housing 111 and confines the lever 15 to pivotal movements about the axis of the member 16.

Figure 1B:
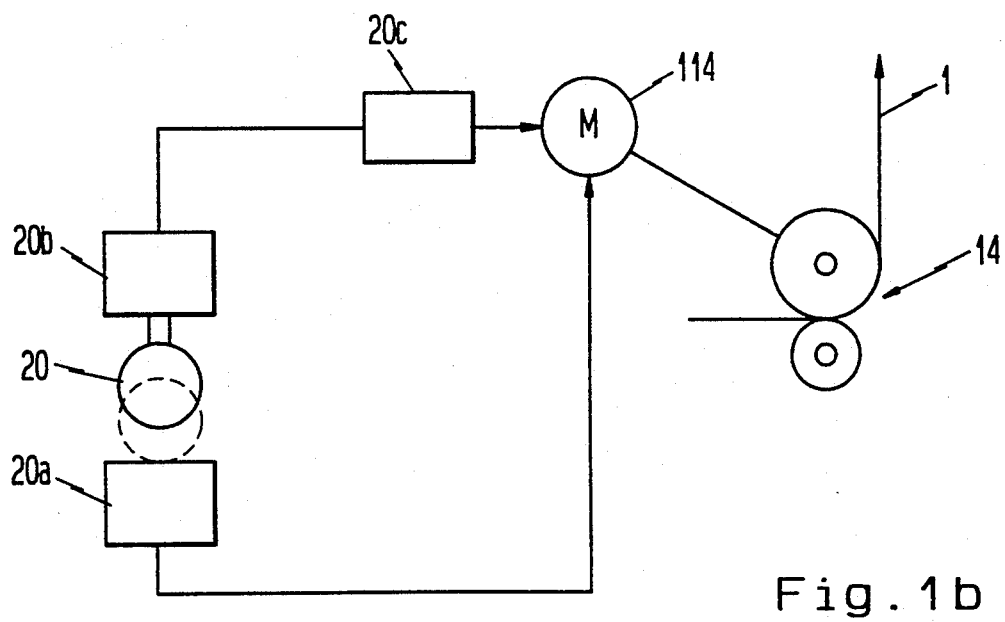
FIG. 1b is a schematic diagram of the circuit for the prime mover of the combined web unwinding and advancing means.

The operation is as follows:

When the apparatus is in use to supply successive increments of the web 1 into the developing machine DM, the prime mover 114 (FIG. 1b) for the rolls of the web advancing device 14 is on and the rolls of the device 14 pull the web 1 so that the latter rotates the carrier 3 in the direction of arrow E. The braking device including the drum 6 and the band 7 opposes rotation of the carrier 3 so that the web 1 is tensioned and maintains the mobile sensor 13 in or close to the solid-line position of FIG. 1. In other words, the sensor 13 is spaced apart from the sensor 20 and the monitoring device including these sensors is deactivated or inoperative. The braking action of the drum 6 and band 7 is minimal or negligible, as long as it suffices to maintain the web 1 under requisite tension and to maintain the sensor 13 away from the broken-line position of FIG. 1. In other words, the spring 19 can store a certain amount of energy.

If the tensioning of the web 1 is excessive, the web pulls the sensor 13 in the direction of arrow A whereby the lever 15 causes its projection 18 to bear against the adjacent end of the leaf spring 17 which pivots the member 11 in a counterclockwise direction (as viewed in FIG. 1). This results in a relaxation of tension of the brake band 7 and a reduction of braking action upon the carrier 3. Thus, the resistance of the carrier 3 to rotation in the direction of arrow E is reduced, the tensioning of the web 1 is reduced and the spring 19 is free to pull the sensor 13 in the direction of arrow B. Thus, the sensor 13 reassumes its normal position, and such movement of the sensor 13 to its normal position is assisted by the spring 24 which biases the member 11, and hence the lever 15, in a clockwise direction. The just described structure including the braking device 6, 7, the member 11, the lever 15 and the springs 17, 19 automatically ensures that the web 1 is maintained under requisite tension while it is being unwound from the carrier 3 and is being advanced into the developing machine DM. In other words, the structure which is shown in FIG. 1 ensures the establishment of a state of equilibrium which, in turn, ensures that the monitoring device including the sensors 13, 20 is inactive while the carrier 3 supplies the web 1 which is drawn from the cassette 2 and is being advanced along the path P into the developing machine DM. The reference character D denotes that portion of the path P for the web 1 which is adjacent the monitoring device including the sensors 13, 20.

The aforementioned state of equilibrium is destroyed when the unwinding of the web 1, and thereupon of the strip 101, from the carrier 3 is completed, i.e., when the trailing end 101a of the strip 101 is automatically separated from the carrier 3 as a result of the pull exerted by the web 1 upon the strip 101. Such state of equilibrium is also destroyed if the web 1 happens to break or tear somewhere between the outlet 2a of the cassette 2 and the nip of the rolls forming part of the advancing device 14. The spring 19 is then free to pivot the lever 15 and the sensor 13 in the direction of arrow B until the force exerted by the brake band 7 upon the pivotable member 11 exceeds the force of the coil spring 24. Since the projection 18 is not affixed to the leaf spring 17, the spring 19 is free to continue to pivot the lever 15 in the direction of arrow B after the member 11 comes to a halt because the force with which the band 7 opposes clockwise rotation of the member 11 is greater than the bias of the spring 24.

The bias of the spring 19 is preferably selected in such a way that this spring does not appreciably influence the aforediscussed state of equilibrium during normal operation of the apparatus, i.e., while the strip 101 is still attached to the carrier 3 and while the device 14 is operative to advance the web 1 into the developing machine DM. The spring 19 can be omitted altogether if the apparatus of FIG. 1 is equipped with a device (indicated by phantom lines, as at 115) which becomes operative only when the lever 15 moves (in the direction of arrow B) beyond its normal position and should be pivoted all the way to the broken-line position of FIG. 1 while the member 11 is held against pivoting under the action of the spring 24 (i.e., while the member 11 is held by the brake band 7). The device 115 can include a magnet (e.g., an electromagnet) which begins to attract the lever 15 after the latter assumes a predetermined position between the solid-line and broken-line positions of FIG. 1. Alternatively, the device 115 can include a mechanical pivoting unit which becomes effective in a certain angular position of the lever 15 and then proceeds to pivot the lever 15 to the broken-line position of FIG. 1. The exact construction of the device 115 forms no part of the present invention; such devices are known in the art.

As the lever 15 continues to pivot under the action of the coil spring 19, it ultimately reaches the broken-line position of FIG. 1 and the monitoring device including the sensors 13, 20 is activated, i.e., these sensors are then in a position or condition to track the strip 101 and to generate a signal in response to detection of the trailing end 101a of the strip 101. Activation of the monitoring device preferably begins not earlier than when the leader 101b of the strip reaches the portion D of the path P for the web 1. To this end, the length L of the strip 101 (see FIG. 1a) is selected in such a way that it is slightly greater than the distance of the carrier 3 from the portion D of the path P. This ensures that the trailing end 101a of the strip 101 is still connected to the carrier 3 when the leader 101b of the strip reaches the path portion D, i.e., the sensor 13 can move to the broken-line position of FIG. 1 only when the leader 101b reaches or has advanced beyond the sensor 13. Thus, the sensor 20 cannot engage the web 1 (i.e., it cannot engage any of the exposed but undeveloped customer films which are spliced together end-to-end to form the web 1) and cannot damage the emulsion at that side of the web which faces away from the periphery of the sensor 13.

The sensor 13 depresses the sensor 20 against the resistance of the spring 23 when it reaches the broken-line position of FIG. 1 whereby a switch 20a (FIG. 1b), which is actuated by the sensor 20, reduces the speed of the prime mover 114 for the rolls of the advancing device 14 from a standard speed or higher speed to a lower or second speed. Such deceleration of the web 1 (and hence of the strip 101 which trails the web) enables the monitoring device to more reliably detect the trailing end 101b of the strip 101 and to generate a signal at the exact instant when the trailing end 101a is located at a predetermined distance from the splicing device 26. The latter is installed at a second path portion F between the path portion D and the nip of the rolls forming part of the advancing device 14.

When the trailing end 101a of the strip 101 advances beyond the nip of the sensors 13, 20, a radially outwardly extending ring-shaped peripheral portion or projection of the sensor 20 is free to penetrate into a circumferentially complete recess or groove 25 in the peripheral surface of the sensor 13 (see FIG. 2) under the bias of the spring 23. This spring then maintains the sensor 20 in the solid-line position of FIG. 1. Penetration of the radially outwardly extending ring-shaped projection of the sensor 20 into the recess 25 of the sensor 13 results in actuation of a second switch 20b (FIG. 1b) which starts a suitable pulse generator 20c in the circuit of the prime mover 114. The pulse generator 20c transmits to the prime mover 114 a preselected number of pulses which cause the prime mover to advance the web 1 and the strip 101 through a predetermined distance, namely a distance which is necessary to locate the trailing end 1a of the web 1 in a predetermined portion of the spicing device 26. The pulse generator 20c also causes a transverse cutter 26a of the device 26 to trim the trailing end 1a of the web 1 so that the latter can be accurately spliced with the leader of a second web (not shown) extending from a second cassette replacing the cassette 2 and containing a rotary carrier or core which is separably connected to the strip at the trailing end of the second web. The prime mover 114 can constitute of include a suitable stepping motor which can advance the web 1 with a high degree of accuracy (i.e., through an accurately selected distance) in response to signals from the pulse generator 20c. The last signal from the pulse generator 20c can further serve to initiate an automatic splicing operation which results in proper attachment of the trimmed trailing end 1a of the web 1 to the leader of the next following web.

Figure 2:
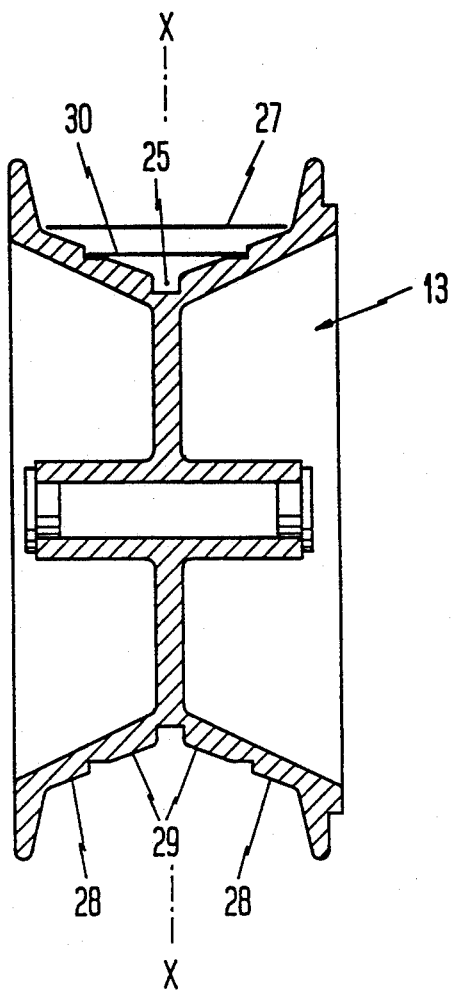
FIG. 2 is an enlarged axial sectional view of a rotary pulley-shaped sensor in the monitoring means of the apparatus which is shown in FIG. 1.

FIG. 2 shows that the peripheral surface of the sensor 13 includes several pairs of annular portions such as those shown at 28 and 29. The annular portions 29 have a first diameter and flank the recess 25, and the annular portions 28 have a larger second diameter and flank the annular portions 29. The annular portions 29 serve for accurate guidance of a web 30 having a first width, and the annular portions 28 serve to accurately guide a web 27 having a greater second width. The illustrated sensor 13 can be replaced with a sensor which is designed to guide only one type of webs (such as 27 or 30) or three or more types of webs each having a different width. The web 27 can be assembled of customer films of the type or format known as No. 135, and the web 30 can be assembled of narrower customer films of the type or format known as No. 110. These are two of the most popular formats.

The purpose of the strips 101 is to reduce the likelihood of damage to the webs 1, i.e., to the exposed frames of customer films which are spliced together or otherwise joined end-to-end to form the webs 1. Thus, the strips 101 ensure that the trailing ends 1a of the webs 1 need not be directly connected to the carriers 3 which could result in damage to the rearmost exposed frame or frames of the rearmost film of a web 1. In accordance with a feature of the present invention, the strips 101 perform the additional useful function of facilitating accurate positioning of the trailing ends 1a of webs 1 at the splicing station F, i.e., relative to the leaders of the next-following webs.

As already described hereinbefore, the monitoring device including the signal generating sensors 13 and 20 is designed in such a way that it becomes active or operative when the trailing end 1a of a web 1 is already advanced beyond the portion D of the path P, i.e., when the sensors 13, 20 cannot damage any part of the web as a result of movement of the sensor 13 to the broken-line position of FIG. 1 in which the strip 101 is caused to contact the sensor 20. The parts 6, 7, 11, 17, 18, 24 cooperate to monitor the torque upon the carrier 3; when such torque is reduced as a result of separation of the trailing end 101a of the strip from the carrier 3, the torque monitoring means enables the spring 19 and/or the device 115 to activate the monitoring device including the sensors 13, 20 so that such monitoring device is in a condition to track the strip 101 for the presence of the trailing end 101a after the trailing end 1a of the web 1 has been advanced beyond the portion D of the path P. By the simple expedient of selecting the length L of the strip 101 in such a way that it at least equals the distance of the carrier 3 from the monitoring device 13, 20, one ensures that the monitoring device is activated only when the trailing end 1a of the web 1 has been advanced beyond the portion D of the path P, i.e., the sensor 20 cannot coact with the sensor 13 to damage or deface the web 1. In other words, the integrity of information which is borne by the web 1 cannot be affected by the activated monitoring device which serves to generate a signal in response to detection of the trailing end 101a of the strip 101.

Since the length of the strip 101 is known, the pulse generator 20c can be readily set in such a way that it causes the prime mover 114 to advance the trailing end 1a of the web 1 into a predetermined portion of the splicing device 26 starting with the instant of detection of the trailing end 101a of the strip 101, i.e., with the instant of penetration of the peripheral projection of the sensor 20 into the groove 25 of the mobile sensor 13. Such penetration takes place under the bias of the spring 23. The arrangement may but need not be such that the prime mover 114 comes to a halt in response to detection of the trailing end 101a and is thereupon set in motion to advance the web 1 through an accurately selected distance which is determined by the number of pulses to be transmitted by the pulse generator 20c. The feature that the speed of the prime mover 114 is reduced by the switch 20a in response to pivoting of the arm 21 by the sensor 13 (when the latter reaches the broken-line position of FIG. 1) also contributes to more accurate positioning of the trailing end 1a of the web 1 in the splicing device 26 because such deceleration of the prime mover 114 enables the sensors 13, 20 to generate a signal in instantaneous response to penetration of the peripheral projection of the sensor 20 into the recess 25 in the peripheral surface of the sensor 13. The latter includes two halves which are mirror images of each other with reference to a plane X—X shown in FIG. 2; such plane halves the recess 25 and is normal to the axis of rotation of the sensor 13.

Though the drawing shows a mechanical monitoring device which generates a signal denoting detection of the trailing end 101a of the sensor 101 as a result of penetration of the peripheral projection of the sensor 20 into the recess 25 of the sensor 13, the improved apparatus can also employ a monitoring device having photoelectronic means for generating signals denoting detection of the trailing end 101a. This is possible because the trailing end 1a of the web 1 is or can be located well beyond the path portion D when the monitoring device is called upon to generate a signal which denotes detection of the trailing end 101a of a strip 101. Mechanical tracking of the strip 101 is acceptable because this strip can exhibit the required mechanical stability and is not coated with photosensitive emulsion so that it can be readily clamped between the sensors 13 and 20.

The sensors 13 and 20 preferably constitute idler rollers. The sensor 13 is rotated by the web 1 and thereupon by the strip 101 when the advancing means 14 is operative to transport the web 1 toward and into the developing machine DM. The sensor 20 is set in rotary motion by the strip 101 when the sensor 13 is moved to the broken-line position of FIG. 1 in which the strip 101 is clamped between the annular portions 28 or 29 of the peripheral surface of the sensor 13 and the circumferentially extending projection of the sensor 20. The strip 101 can rotate the sensor 20 regardless of whether its trailing end 101a is or is not connected to the carrier 3, as long as the sensor 13 is maintained in the broken-line position of FIG. 1.

Instead of utilizing the aforediscussed pulse generator 20c, it is equally possible to provide the apparatus with means for monitoring the number of revolutions of the sensor 13 and/or 20 after the sensor 13 reaches the broken-line position of FIG. 1 and for arresting the prime mover 114 after a selected number of revolutions; this also results in accurate positioning of the trailing end 1a of the web 1 at the splicing station F.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. A method of locating a trailing end of an elongated flexible strip having a leader affixed to a trailing end of an elongated flexible web of photosensitive material which is wound onto a rotary carrier separably connected to the trailing end of the strip, comprising the steps of unwinding successive increments of the web from the carrier and advancing the unwound increments along a predetermined path; positioning next to a predetermined portion of said path a signal generating monitoring device which is activatable to detect the trailing end of the strip; and activating the monitoring device upon advancement of the leader of the strip at least into said portion of said path.

2. The method of claim 1 of positioning a trailing end of an elongated flexible strip having a predetermined length, wherein said portion of said path is spaced apart from the carrier a distance at most equal to said predetermined length, said unwinding and advancing step including rotating the carrier by the strip until the trailing end becomes separated from the carrier, said activating step including setting the monitoring device in operation to detect the trailing end of the strip at least substantially simultaneously with termination of rotation of the carrier by the strip.

3. The method of claim 2, wherein said advancing step includes transporting the web along said path at a first speed prior to and at a lesser second speed following activation of the monitoring device.

4. The method of claim 3, wherein said advancing step includes transporting the web through a predetermined distance following detection of the trailing end of the strip by the monitoring device.

5. The method of claim 1, wherein said positioning step includes utilizing a mechanical monitoring device.

6. The method of claim 1, wherein said positioning step includes utilizing a photoelectronic monitoring device.

7. The method of claim 1, further comprising the step of braking the carrier in the course of said unwinding and advancing step.

8. The method of claim 7, wherein said braking step comprises applying to the carrier a variable braking force and further comprising the step of varying said braking force as a function of tension of the web.

9. Apparatus for locating a trailing end of an elongated flexible strip having a leader affixed to a trailing end of a web of photosensitive material which is wound onto a rotary carrier separably connected to the trailing end of the strip, comprising means for rotatably supporting the carrier; means for unwinding successive increments of the web from the carrier and for advancing the unwound increments along a predetermined path; and a monitoring device adjacent a predetermined portion of said path and including means for generating signals, said signal generating means being activatable to generate a signal in response to detection of the trailing end of the strip in said portion of said path and said signal generating means being activated in response to advancement of the leader of the strip at least into said portion of said path.

10. The apparatus of claim 9, wherein said signal generating means comprises a first sensor, a second sensor movable relative to said first sensor, and means for biasing said second sensor toward an operative position in which said sensors can generate a signal, the web being trained over said second sensor to oppose the movement of said second sensor to said operative position while the trailing end of the strip remains connected to said carrier.

11. The apparatus of claim 10, wherein at least one of said sensors comprises a rotary member.

12. The apparatus of claim 10, wherein said first sensor comprises a rotary member and further comprising means for monitoring the rotation of said first sensor.

13. The apparatus of claim 10, wherein said first and second sensors respectively comprise first and second rotary members and one of said rotary members has a peripheral surface with a circumferentially extending recess which is overlapped by the web and thereupon by the strip during advancement of the web along said path, the other of said rotary members extending into said recess in response to advancement of the strip beyond said rotary members to thereby initiate the generation of a signal.

14. The apparatus of claim 13, wherein said recess is provided in said second rotary member.

15. The apparatus of claim 14, wherein said second rotary member includes two halves which are mirror images of each other with reference to a plane halving said recess.

16. The apparatus of claim 14, wherein said peripheral surface includes a plurality of stepped annular portions at opposite sides of said recess.

17. The apparatus of claim 16, wherein said annular portions include two first annular portions adjacent said recess and having a first diameter and two second annular portions having a greater second diameter, said first annular portions and said recess between them being disposed between said second annular portions.

18. The apparatus of claim 9, further comprising means for splicing the trailing end of the web in said path downstream of said signal generating means with a leader of a second web having a trailing end connected to the leader of a second strip, said splicing means including means for severing the leader of the strip behind the web in said path downstream of said splicing means from the web.

* * * * *